(12) United States Patent
Cao et al.

(10) Patent No.: US 12,197,753 B2
(45) Date of Patent: Jan. 14, 2025

(54) METHOD AND SYSTEM FOR DATA UPLOADING BETWEEN BLOCKCHAIN NODES, AND COMPUTER-READABLE STORAGE MEDIUM

(71) Applicant: JINGDONG TECHNOLOGY INFORMATION TECHNOLOGY CO., LTD., Beijing (CN)

(72) Inventors: Long Cao, Beijing (CN); Chao Ma, Beijing (CN); Haibo Sun, Beijing (CN); Yi Wang, Beijing (CN); Ming Zhao, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/769,511

(22) PCT Filed: May 15, 2020

(86) PCT No.: PCT/CN2020/090654
§ 371 (c)(1),
(2) Date: Apr. 15, 2022

(87) PCT Pub. No.: WO2021/082401
PCT Pub. Date: May 6, 2021

(65) Prior Publication Data
US 2024/0134549 A1  Apr. 25, 2024
US 2024/0231658 A9  Jul. 11, 2024

(30) Foreign Application Priority Data

Oct. 30, 2019 (CN) .......................... 201911048190.3

(51) Int. Cl.
*G06F 12/00* (2006.01)
*G06F 3/06* (2006.01)

(52) U.S. Cl.
CPC ............ *G06F 3/064* (2013.01); *G06F 3/0659* (2013.01); *G06F 3/0604* (2013.01); *G06F 3/067* (2013.01)

(58) Field of Classification Search
CPC ...... G06F 3/064; G06F 3/0659; G06F 3/0604; G06F 3/067
(Continued)

(56) References Cited

U.S. PATENT DOCUMENTS

| | | |
|---|---|---|
| 9,559,889 B1 | 1/2017 | Vincent et al. |
| 2018/0204213 A1 | 7/2018 | Zappier et al. |
| 2019/0057115 A1 | 2/2019 | Liu et al. |
| 2019/0068615 A1 | 2/2019 | Pack et al. |
| 2019/0306176 A1 | 10/2019 | Gleichauf |

FOREIGN PATENT DOCUMENTS

| | | |
|---|---|---|
| CN | 107332876 A | 11/2017 |
| CN | 107423426 A | 12/2017 |

(Continued)

OTHER PUBLICATIONS

Extended European Search Report issued in counterpart European Patent Application No. 20883303.8, dated Aug. 1, 2022.
(Continued)

*Primary Examiner* — Mardochee Chery
(74) *Attorney, Agent, or Firm* — Westbridge IP LLC

(57) ABSTRACT

Disclosed are a method and a system for data uploading, which belongs to the technical field of blockchain. The method comprises: receiving a block upload request sent by a slave server of a target node; determining whether block data corresponding to the block upload request has been uploaded to a block data storage system; if the block data corresponding to the block upload request is not uploaded to the block data storage system, acquiring the block data if the block data corresponding to the block upload request is not uploaded to the block data storage system, and uploading the block data to a storage space of the block data storage (Continued)

system; and sending an uploading success instruction to the slave server if the uploading is successful, so as to instruct the slave server to delete the block data stored on a light-weight peer in the target node.

10 Claims, 4 Drawing Sheets

(58) Field of Classification Search
USPC .......................................................... 711/154
See application file for complete search history.

(56) References Cited

FOREIGN PATENT DOCUMENTS

| CN | 108540566 A | 9/2018 | |
|---|---|---|---|
| CN | 108875411 A | 11/2018 | |
| CN | 109299336 A | 2/2019 | |
| CN | 110046894 A | 7/2019 | |
| CN | 110958300 A | 4/2020 | |
| JP | 2003196129 A | 7/2003 | |
| JP | 2007201861 A | 8/2007 | |
| JP | 2020038610 A | * | 3/2020 |

OTHER PUBLICATIONS

First Office Action issued in counterpart Chinese Patent Application No. 201911048190.3, dated Apr. 6, 2021.
Second Office Action issued in counterpart Chinese Patent Application No. 201911048190.3, dated Oct. 25, 2021.
International Search Report issued in corresponding PCT Application No. PCT/CN2020/090654, dated Jul. 29, 2020.
Notice of Reasons for Refusal issued in counterpart Japanese Patent Application No. 2022-519757, dated Apr. 4, 2023.
Written Opinion issued in corresponding PCT Application No. PCT/CN2020/090654, dated Jul. 29, 2020.

* cited by examiner

METHOD AND SYSTEM FOR DATA UPLOADING BETWEEN BLOCKCHAIN NODES, AND COMPUTER-READABLE STORAGE MEDIUM

CROSS-REFERENCE OF RELATED APPLICATIONS

This application is the National Stage of International Application No. PCT/CN2020/090654, filed on May 15, 2020, which claims priority to Chinese Patent Application No. 201911048190.3, entitled "METHOD, SYSTEM AND apparatus FOR DATA UPLOADING, ELECTRONIC DEVICE AND COMPUTER-READABLE STORAGE MEDIUM", filed on Oct. 30, 2019, the entire contents of which are incorporated herein by reference.

TECHNICAL FIELD

The present disclosure relates to the field of blockchain technology, and in particular, to a method and a system for data uploading, an electronic device, and a computer-readable storage medium.

BACKGROUND

Blockchain refers to a traceable, non-tamperable distributed accounting mechanism implemented by cryptography technology, peer-to-peer network, consensus mechanism, and block chain data structure organized in time series. The transaction in the blockchain technology ecology will distribute each transfer to each node and get their confirmation, and the transaction may only be completed if all nodes reach a consensus, which means each node also contains a full-amount of ledger at the same time, resulting that a large space of the disk is occupied and the network is adversely operated, from the perspective of the entire network.

SUMMARY

The purpose of the embodiments of the present disclosure is to provide a method, a system, an apparatus for data uploading, an electronic device, and a computer-readable storage medium to solve the problem that multiple nodes of the blockchain occupy a large disk space. The specific technical solutions are as follows.

In first aspect, there is provided a method for data uploading, including the following steps:
receiving a block upload request sent by a slave server of a target node;
determining whether block data corresponding to the block upload request has been uploaded to a block data storage system;
acquiring the block data if the block data corresponding to the block upload request is not uploaded to the block data storage system, and uploading the block data to a storage space of the block data storage system; and
sending an uploading success instruction to the slave server if the uploading is successful, so as to instruct the slave server to delete the block data stored on a light-weight peer of the target node.

In an embodiment of the present disclosure, the method further includes the following step:
sending an already-uploaded response to the slave server if the block data corresponding to the block upload request has been uploaded to the block data storage system, such that the slave server deletes the block data of the light-weight peer.

In an embodiment of the present disclosure, acquiring the block data includes the following step:
acquiring the block data from a full-amount peer, where the full-amount peer and the block data storage system are in a same local area network.

In an embodiment of the present disclosure, acquiring the block data includes the following step:
acquiring the block data from the light-weight peer, where the light-weight peer and the slave server are in the same local area network.

In an embodiment of the present disclosure, the method further includes the following steps:
parsing out identification information of the block data from the block upload request; and
determining the block data corresponding to the block upload request based on the identification information.

In an embodiment of the present disclosure, determining whether the block data corresponding to the block upload request has been uploaded to the block data storage system includes the following steps:
recording a historical block upload request;
determining whether the identification information contained in the block upload request is consistent with historical identification information contained in the historical block upload request; and
deciding, if the identification information contained in the block upload request is consistent with the historical identification information contained in the historical block upload request, that the block data corresponding to the block upload request has been uploaded to the block data storage system.

In an embodiment of the present disclosure, the method further includes the following steps:
receiving a data query request sent by the slave server, where the data query request is used to request query of the block data of the light-weight peer;
sending the data query request to the block data storage system, such that the block data storage system searches for block storage data containing the block data according to the data query request;
receiving the block storage data sent by the block data storage system; and
sending the block storage data to the slave server, such that the slave server sends the block storage data to the light-weight peer, and querying the block data from the block storage data by means of the light-weight peer.

In a second aspect, there is provided a system for data uploading, which includes a light-weight peer, a server, a block data storage system and a slave server, where:
the light-weight peer configured to store block data;
the server configured to receive a block upload request, send the block data to a block data storage system, and send an uploading success instruction to a slave server after the uploading is completed;
the block data storage system configured to receive the block data sent by the server, and send upload-ending information to the server; and
the slave server configured to receive the uploading success instruction from the server and delete the block data of the light-weight peer.

In third aspect, there is provided an apparatus for data uploading, which includes:
a receiving module, configured to receive a block upload request sent by a slave server of a target node;

a determining module, configured to determine whether block data corresponding to the block upload request has been uploaded to a block data storage system;

an acquiring module, configured to acquire the block data if the block data corresponding to the block upload request is not uploaded to the block data storage system, and upload the block data to a storage space of the block data storage system; and a sending module, configured to send an uploading success instruction to the slave server if the uploading is successful, so as to instruct the slave server to delete the block data stored on a light-weight peer of the target node.

In fourth aspect, there is provided an electronic device including a memory and a processor, a computer program that can run on the processor being stored in the memory, where the processor implements the steps of anyone of the preceding method claims when executing the computer program.

In fifth aspect, there is provided a computer-readable storage medium having non-volatile program code executable by a processor, where the program code causes the processor to perform anyone of the methods.

The above embodiments of the present disclosure have the following advantages. In the present disclosure, the block data storage system is adopted to centrally store historical ledger of each node, such that each node only stores the latest information data, which can reduce the disk occupation as well as redundant information of the disk. It is obvious that implementing anyone of the products or methods of the present disclosure does not necessarily need to achieve all the advantages described above at the same time.

BRIEF DESCRIPTION OF THE DRAWINGS

In order to more clearly illustrate technical solutions in embodiments of the present disclosure, the drawings need to be used in the description of the embodiments will be briefly introduced in the following. It is obvious for those of ordinary skill in the art that other drawings can be obtained based on these drawings without paying creative labor.

DETAILED DESCRIPTION OF THE EMBODIMENTS

The embodiments of the present disclosure will be described clearly and completely in conjunction with the drawings in the embodiments of the present disclosure so as to make the objectives, technical solutions, and advantages of the embodiments of the present disclosure clearer. Obviously, the described embodiments are merely a part rather than all embodiments of the present disclosure. Based on the embodiments of the present disclosure, all other embodiments obtained by those of ordinary skill in the art without making creative efforts shall fall within the protection scope of the present disclosure.

Figure 1:
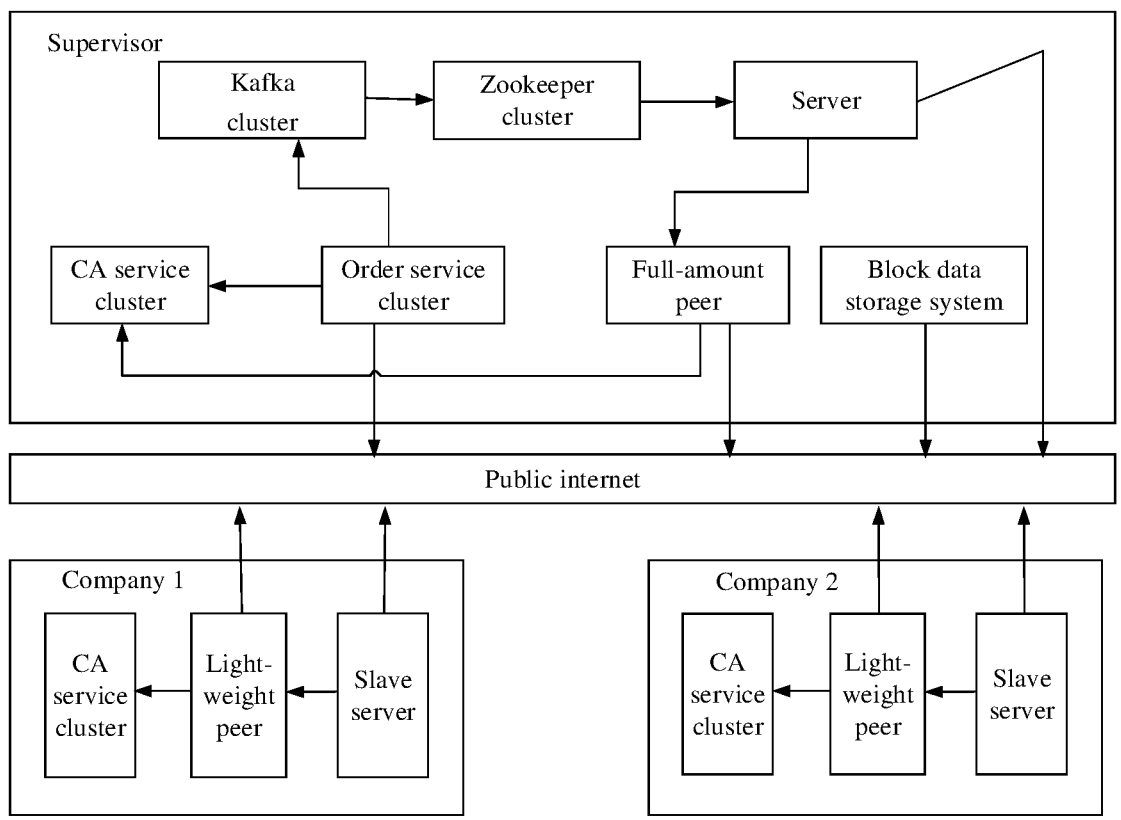
FIG. 1 is a schematic diagram of an overall framework provided by an embodiment of the present disclosure.

An embodiment of the present disclosure provides a method for data uploading, which may be applied to a server in a system for data uploading. As shown in FIG. 1, which is a schematic diagram of a framework for data uploading provided by an embodiment of the present disclosure, the framework includes a slave server, a server, a light-weight peer, a full-amount peer and a block data storage system. Among them, the light-weight peer is a node that stores the latest block data in the blockchain, and the full-amount peer is a node that stores all block data in the blockchain. When the number of nodes in the blockchain is large, massive disk space will be occupied. The slave server and the light-weight peer are located in the same local area network. The block data may be uploaded to the server according to block data storage capacity of the light-weight peer, and the block data in the light-weight peer may be deleted. The server and the block data storage system exist in the same local area network. The server and the slave server transmit and communicate information to and from each other. The server receives a block upload request sent by the slave server and determines whether to upload the request to the block data storage system. If the server upload the request to the block data storage system, an uploading success instruction returned by the block data storage system is sent to the slave server, such that the slave server deletes the block data in the light-weight peer, and if the server determines that it is unnecessary to upload the request to the block data storage system, an already-uploaded instruction is sent to the slave server, such that the slave server deletes the block data in the light-weight peer.

Figure 2:
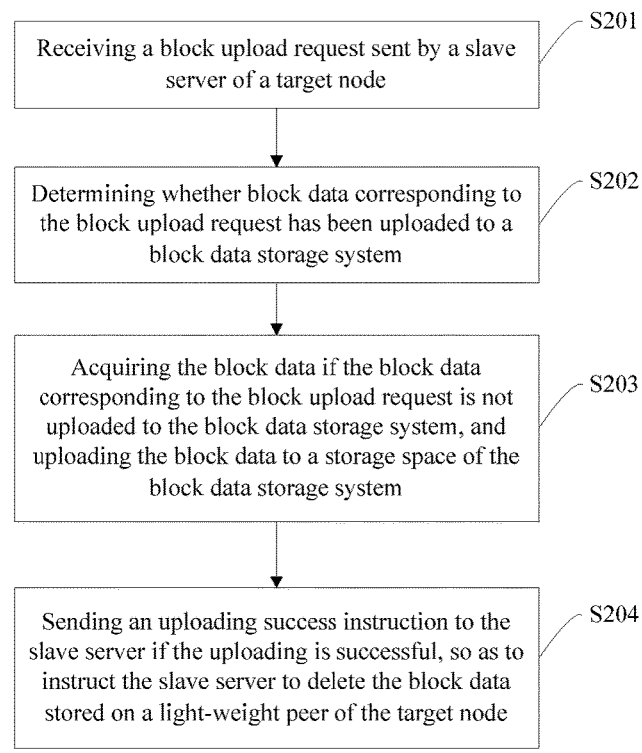
FIG. 2 is a flowchart of a method for data uploading provided by an embodiment of the present disclosure.

In the following, a method for data uploading provided in embodiments of the present disclosure will be described in detail in conjunction with specific implementations. As shown in FIG. 2, and the specific steps are the following steps S201 to S204.

At Step S201: receiving a block upload request sent by a slave server of a target node.

Blockchain is a new application model of computer technology such as distributed data storage, peer-to-peer transmission, consensus mechanism, encryption algorithm, etc. The transaction in the blockchain technology ecology will distribute each transfer to each target node and get their confirmation, and then the transaction is completed. Since each target node in the blockchain stores the same block data, a large space of the disk is occupied and is not conducive to the long-term stable operation of the system, so the same block data in the target node needs to be uploaded.

The target node includes a light-weight peer and a slave server. Before the target node uploads the block data of the light-weight peer, the slave server generates a block upload request corresponding to the block data and sends it to the server, and the server receives the block upload request.

At Step S202: determining whether block data corresponding to the block upload request has been uploaded to a block data storage system.

In the blockchain, there is a plurality of light-weight peers containing the same block data. The sever analyzes the block upload request received and determine whether the block data corresponding to the block upload request has been uploaded to the block data storage system so as to prevent multiple pieces of block data from being repeatedly uploaded to the block data storage system. Specifically, the server determines identification information corresponding to the block upload request to determine whether the identification information corresponding to the block upload request is consistent with historical identification information contained in a historical block upload request, thereby deciding whether block data corresponding to the block upload request has been uploaded to the block data storage system. The identification information refers to the characteristics of the block data corresponding to the block upload request, for example, English or digital codes, symbols, patterns, etc., but the embodiment of the present disclosure is not specifically limited.

The block data storage system is a highly fault-tolerant system that is able to provide high-throughput data access and is very suitable for applications on large-scale data sets. In embodiments of the present disclosure, HDFS (Hadoop Distributed System, Hadoop Distributed File System) is described as an example of the block data storage system. The size of HDFS file is in the range of GB to TB. Therefore, HDFS is adjusted to support large files, it should provide high aggregate data bandwidth where hundreds of nodes can be supported in one cluster, in which tens of millions of files should be supported in one cluster as well. HDFS opens file namespace to the outside world and allows user data to be stored in the form of files.

At Step S203: acquiring the block data if the block data corresponding to the block upload request is not uploaded to the block data storage system, and uploading the block data to a storage space of the block data storage system.

If the server determines that the identification information contained in the block upload request is inconsistent with the historical identification information contained in the historical block upload request, it indicates that the block data corresponding to the identification information has not been uploaded to the block data storage system. Therefore, the server acquires the block data, and uploads the block data to the block data storage system.

At Step S204: sending an uploading success instruction to the slave server if the uploading is successful, so as to instruct the slave server to delete the block data stored on a light-weight peer of the target node.

If the server successfully uploads the block data to the block data storage system, the light-weight peer in the blockchain and the block data storage system contain the same block data. For the purpose of reducing the disk occupation, after the successful uploading, the server will send the uploading success instruction back to the slave server, and record the block upload request corresponding to the uploading success instruction as a historical block upload request so as to be compared with the new block upload request. After receiving the uploading success instruction, the slave server deletes the block data stored on the light-weight peer.

Since each light-weight peer stores the same block data, after one of the light-weight peers sends the block data to the block data storage system, the block upload request of the light-weight peer that has uploaded the block data is the historical block upload request. In this case, if the server receives a block upload request from another light-weight peer, the identification information of the block data contained in the block upload request of another light-weight peer is consistent with the identification information of the block data contained in the historical block upload request, the server will decide that the block data of another light-weight peer has been uploaded to the block data storage system, send an already-uploaded response to the slave server indicating that the block data is unnecessary to be uploaded again, and instruct the slave server to delete the block data of the light-weight peer sending the block upload request.

In an embodiment of the present disclosure, the embodiment of the present disclosure may also be that, after the server successfully uploads the block data of one light-weight peer to the block data storage system, due to that the block data contained in the light-weight peer is the same as that contained in a light-weight peer in another target node, the server automatically sends a delete instruction to each slave server such that slave server may delete the block data of the light-weight peer in the corresponding target node in time, which avoids the server from repeatedly receiving the block upload request of the light-weight peers of the other target nodes, reduces data calculation of the server and reduces the data traffic occupied by the block upload requests respectively corresponding to the light-weight peers of the other target nodes.

In an embodiments of the present disclosure, there is a slave server in the blockchain, and the slave server and the light-weight peer are in the same local area network. The slave server monitors the regional data storage capacity of the light-weight peer, and in case that the regional data storage capacity of the light-weight peer exceeds a set threshold, the slave server sends the block upload request to the server, where the block upload request is used to request to upload the block data to the block data storage system.

In a case that the regional data storage capacity of the light-weight peer exceeds the set threshold, the slave server sends the block upload request to the server so as to upload the block data to the block data storage system by means of the server and delete the block data in the light-weight peer to reduce the disk space occupation.

In an embodiment of the present disclosure, the slave server may further periodically send the block upload request to the server to avoid excessive block data being stored in the light-weight peer and wasting disk space occupation.

In an embodiment of the present disclosure, the server acquires the block data and uploads the block data to the block data storage system by means of the following two ways.

Acquisition method 1: the server acquires the block data from the light-weight peer and uploads the block data to the block data storage system, and the light-weight peer and the slave server are in the same local area network.

Acquisition method 2: the server acquires the block data from a full-amount peer and uploads the block data to the block data storage system. The full-amount peer, server and block data storage system are in the same local area network, and a light-weight peer and the slave server are in another local area network. Therefore, the server acquires the block data from the full-amount peer in the same local area network, which may speed up the block data acquisition.

In an embodiment of the present disclosure, the specific method of acquiring the block data is: parsing out, by the server, the identification information of the block data from the block upload request received from the slave server, and acquiring the block data corresponding to the identification information from the light-weight peer of the blockchain based on the identification information.

In an embodiment of the present disclosure, acquiring the block data is performed by parsing out the identification information of the block data from the block upload request, and determining the block data corresponding to the block upload request based on the identification information.

In an embodiment of the present disclosure, each block data to be uploaded corresponds to one block upload request, and the server may parse out the identification information of the corresponding block data from the block upload request. The identification information refers to the characteristics of the block data corresponding to the block upload request, for example, English or digital codes, symbols, patterns, etc., but the embodiment of the present disclosure is not specifically limited. Based on the identification information, the server determines the block data corresponding to the block upload request.

In an embodiment of the present disclosure, the method further includes: recording a historical block upload request; determining whether the identification information contained in the block upload request is consistent with historical identification information contained in the historical block upload request; and if the identification information contained in the block upload request is consistent with the historical identification information contained in the historical block upload request, deciding that the block data corresponding to the block upload request has been uploaded to the block data storage system.

For the block data of the light-weight peer, each block upload request contains the identification information corresponding to the block data. The server records the historical block upload request corresponding to the identification information of the uploaded block data every time the block data is uploaded to the block data storage system. When the server receives a new block upload request, it will determine whether the identification information contained in the new block upload request is consistent with the historical identification information contained in the historical block upload request, so as to decide whether the block data corresponding to the identification information has ever been uploaded to the block data storage system. If the consistency is determined, it is decided that the block data corresponding to the block upload request has been uploaded to the block data storage system.

For the purpose of reducing the disk space occupation, in an embodiment of the present disclosure, the number of block data storage systems is less than the total number of light-weight peers in the disk. In this case, repeated block data in the block data of each light-weight peer uploaded to the block data storage system may be reduced so as to reduce the disk space occupation. For example, the disk contains ten light-weight peers that contain the same block data, and the number of block data storage systems is three. After all the light-weight peers respectively upload the block data to the three block data storage systems, all the block data in the ten light-weight peers are deleted, and then the disk contains only three pieces of identical block data which respectively exist in the three block data storage systems, which may reduce the disk space occupation and save cost as well as achieve the purpose of backup to prevent loss of the block data.

Figure 4:
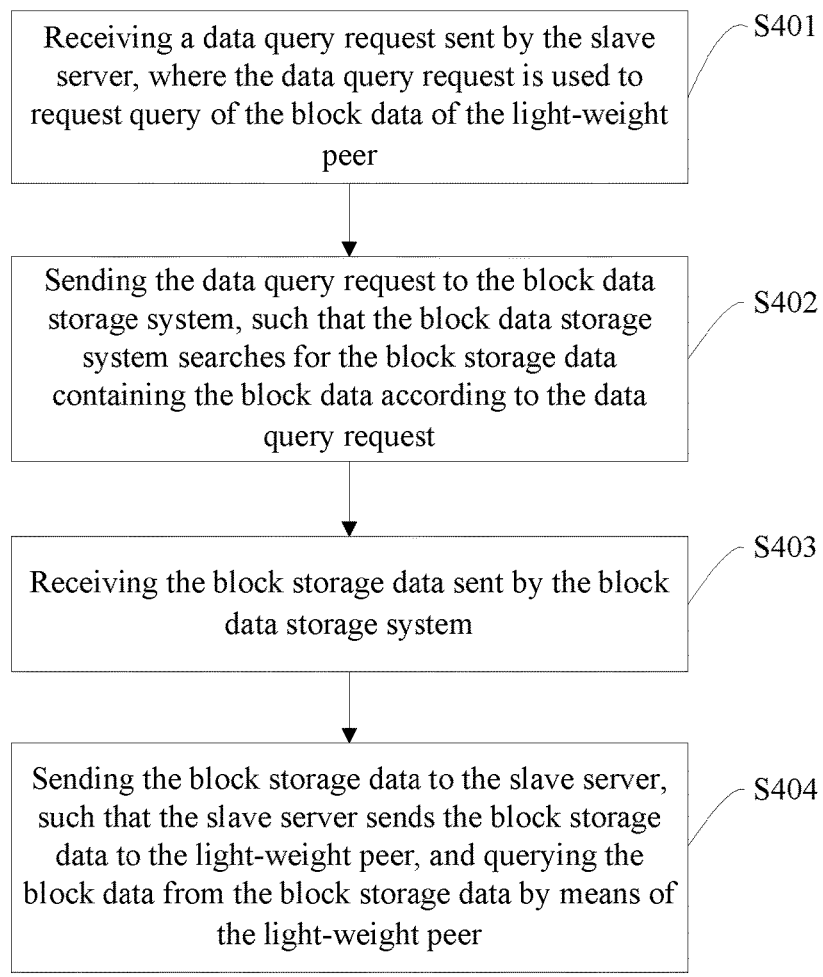
FIG. 4 is a flowchart of a method of data query provided by an embodiment of the present disclosure.

An embodiment of the present disclosure also provides a method of data query. As shown in FIG. 4, the method includes the following steps S401 to S404.

At Step S401: receiving a data query request sent by the slave server, where the data query request is used to request query of the block data of the light-weight peer.

Since each light-weight peer has uploaded the block data to the block data storage system, each light-weight peer only contains the latest block data. If a user intends to query the target block data that has been uploaded to the block data storage system, the slave server will send a data query request corresponding to the target block data to the server, and the data query request is used to request query of the block data of the light-weight peer.

At Step S402: sending the data query request to the block data storage system, such that the block data storage system searches for the block storage data containing the block data according to the data query request.

After receiving the data query request sent by the slave server, the server sends the data query request to the block data storage system, and the block data storage system searches for the block storage data containing the block data according to the block data of the data query request and sends the block storage data to the server.

The embodiment of the present disclosure takes HDFS as an example. The internal mechanism of HDFS is to divide one file into one or more blocks, and store these blocks in a set of data nodes. Name nodes are used to manipulate files or directory operations in the file namespace, such as open, close, rename, etc. It also determines the mapping of the blocks to the data nodes, and the data nodes are responsible for reading and writing requests from file system clients. HDFS stores the block data uploaded by multiple servers in the same set of data nodes in advance. After the server receives the data query request sent by the slave server, it sends the data query request to HDFS, and HDFS searches for the block storage data containing the block data according to the block data of the data query request and sends the block storage data to the server.

At Step S403: receiving the block storage data sent by the block data storage system.

The block data storage system sends the block storage data to the server, and the server receives the block storage data sent by the block data storage system.

At Step S404: sending the block storage data to the slave server, such that the slave server sends the block storage data to the light-weight peer, and querying the block data from the block storage data by means of the light-weight peer.

The server block storage data is sent to the slave server, such that the slave server sends the block storage data to the light-weight peer. Since the block storage data contains multiple pieces of block data, the light-weight peer may query the block data corresponding to the data query request among multiple pieces of block so as to complete the query of the block data.

Figure 3:
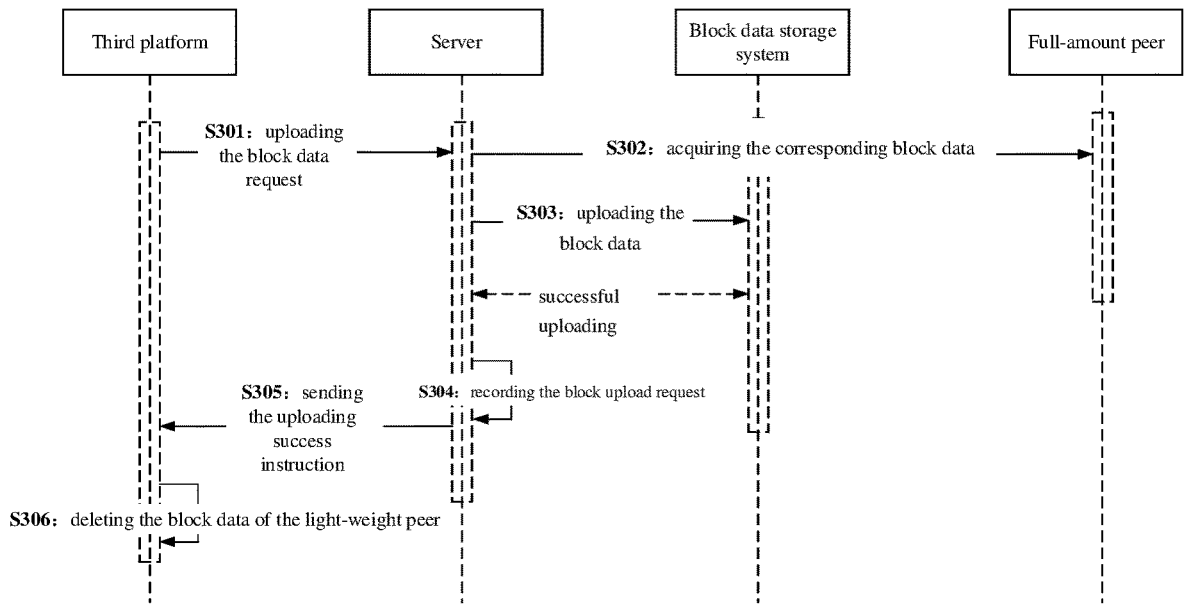
FIG. 3 is a timing diagram of a method for data uploading provided by an embodiment of the present disclosure.

Based on the same technical concept, an embodiment of the present disclosure also provides a timing diagram for data uploading, which includes the following steps S301 to S306 as shown in FIG. 3.

At Step S301: uploading the block upload request.

After the block data storage capacity of the light-weight peer exceeds the preset storage capacity, the slave server sends the block upload request to the server.

At Step S302: acquiring the corresponding block data.

After receiving the block upload request, the server parses out the identification information of the block data contained in the block upload request. If the server determines that the identification information contained in the block upload request is inconsistent with the historical identification information contained in the historical block upload request, the server acquires the block data corresponding to the block upload request from the full-amount peer.

At Step S303: uploading the block data.

The server uploads the block data to the block data storage system. After receiving the block data, the block data storage system sends an uploading success instruction to the server.

At Step S304: recording the block upload request.

The server receives the uploading success instruction and records the block upload request corresponding to the uploading success instruction.

At Step S305: sending the uploading success instruction.

The server returns the uploading success instruction to the slave server.

At Step S306: deleting the block data of the light-weight peer.

After the slave server receives the uploading success instruction, it will delete the block data on the light-weight peer.

Figure 5:
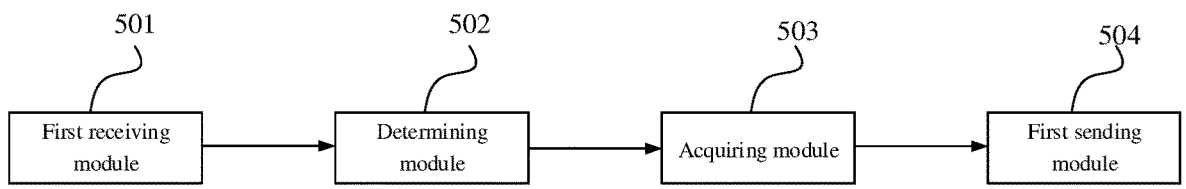
FIG. 5 is a schematic structural diagram of an apparatus for data uploading provided by an embodiment of the present disclosure.

Based on the same technical concept, an embodiment of the present disclosure also provides an apparatus for data uploading. As shown in FIG. 5, the apparatus includes the following modules 501 to 504:

a first receiving module 501 configured to receive a block upload request sent by a slave server of a target node;

a determining module 502 configured to determine whether block data corresponding to the block upload request has been uploaded to a block data storage system;

an acquiring module 503 configured to acquire the block data if the block data corresponding to the block upload request is not uploaded to the block data storage system, and upload the block data to a storage space of the block data storage system; and a first sending module 504 configured to send an uploading success instruction to the slave server if the uploading is successful, so as to instruct the slave server to delete the block data stored on a light-weight peer of the target node.

In an embodiment of the present disclosure, the first sending module 504 is further configured to:

send an already-uploaded response to the slave server if the block data corresponding to the block upload request has been uploaded to the block data storage system, such that the slave server deletes the block data of the light-weight peer.

In an embodiment of the present disclosure, the acquiring module 503 is further configured to:

acquire the block data from a full-amount peer, where the full-amount peer and the block data storage system are in the same local area network In an embodiment of the present disclosure, the acquiring module 503 is further configured to:

acquire the block data from the light-weight peer, where the light-weight peer and the slave server are in the same local area network.

In an embodiment of the present disclosure the acquiring module 503 may include:

a parsing-out unit configured to parse out identification information of the block data from the block upload request; and an acquisition unit configured to determine the block data corresponding to the block upload request based on the identification information.

In an embodiment of the present disclosure, the determining module 502 may include:

a recording unit configured to record a historical block upload request;

a determining unit configured to determine whether the identification information contained in the block upload request is consistent with historical identification information contained in the historical block upload request; and a deciding unit configured to decide that the block data corresponding to the block upload request has been uploaded to the block data storage system if a consistency is determined.

In an embodiment of the present disclosure, the apparatus further includes:

a second receiving module configured to receive a data query request sent by the slave server, where the data query request is used to request query of the block data of the light-weight peer;

a second sending module configured to send the data query request to the block data storage system, such that the block data storage system searches for block storage data containing the block data according to the data query request;

a third receiving module configured to receive the block storage data sent by the block data storage system; and a third sending module configured to send the block storage data to the slave server, such that the slave server sends the block storage data to the light-weight peer, and query the block data from the block storage data by means of the light-weight peer.

The above-mentioned embodiments of the present disclosure have the following advantages. In the present disclosure, the block data storage system is adopted to centrally store historical ledger of each node, such that each node only stores the latest information data, which can reduce the disk occupation as well as redundant information of the disk. In the embodiments of the present disclosure, the block data storage system is designed as a distributed file system that is suitable to run on general-purpose hardware, which is able to provide high-throughput data access and very suitable for applications on large-scale data sets.

Based on the same technical concept, an embodiment of the present disclosure also provides a system for data uploading including a light-weight peer, a slave server, a server and a block data storage system, where, the light-weight peer is configured to store block data;

the server is configured to receive a block upload request, send the block data to a block data storage system, and send an uploading success instruction to a slave server after the uploading is completed;

the block data storage system is configured to receive the block data sent by the server, and send upload-ending information to the server; and the slave server is configured to receive the uploading success instruction from the server and delete the block data of the light-weight peer.

Figure 6:
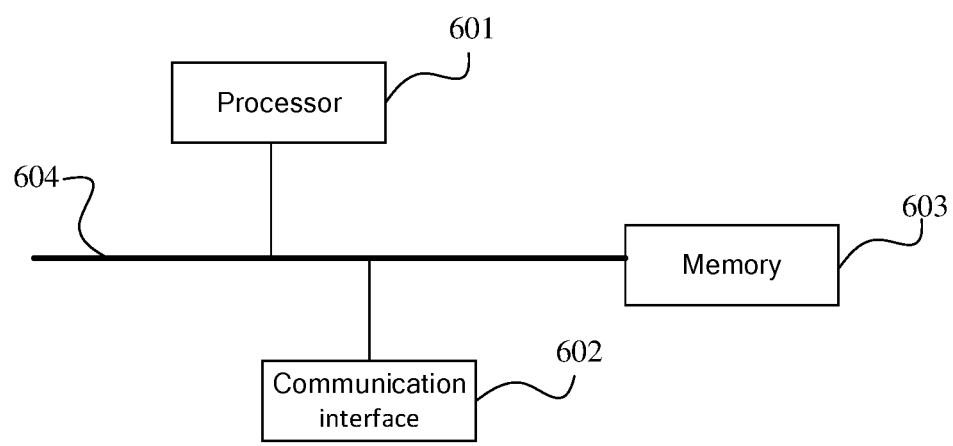
FIG. 6 is a schematic structural diagram of an electronic device provided by an embodiment of the present disclosure.

Based on the same technical concept, an embodiment of the present disclosure also provides an electronic device. As shown in FIG. 6, the electronic device includes a processor 601, a communication interface 602, a memory 603 and a communication bus 604. The processor 601, the communication interface 602, and the memory 603 communicate with each other by the communication bus 604.

The memory 603 is configured to store computer programs.

The processor 601 is configured to execute the programs stored in the memory 603 to implement the steps of the above-mentioned methods for data uploading.

The communication bus mentioned in the above electronic device may be a Peripheral Component Interconnection (PCI) bus or an Extended Industry Standard Architecture (EISA) bus, or the like. The communication bus may be divided into an address bus, a data bus, and a control bus, and the like. For ease of representation, in the figure, the communication bus is only represented by a thick line, but it does not mean that there is only one bus or one type of bus.

The communication interface is used for communication between the above electronic device and other devices.

The memory may include Random Access Memory (RAM), or Non-Volatile Memory (NVM), for example, at least one disk memory. In an embodiment of the present disclosure, the memory may also be at least one storage device located away from the above processor.

The above processor may be a general-purpose processor, including a Central Processing Unit (CPU), a Network Processor (NP), and the like. The processor may also be a Digital Signal Processor (DSP), an Application Specific Integrated Circuit (ASIC), a Field Programmable Gate Array (FPGA) or other programmable logic devices, discrete gates, transistor logic devices, or discrete hardware components.

In yet another embodiment provided by the present disclosure, a computer-readable storage medium, which stores computer programs thereon, is further provided, and when the computer programs are executed by a processor, steps of anyone of the above methods for data uploading are implemented.

In yet another embodiment provided by the present disclosure, a computer program product containing instructions is further provided, and when the product is running on a computer, the computer is caused to perform anyone of the methods for data uploading in the above embodiments.

The above embodiments may be implemented in whole or in part by software, hardware, firmware, or any combination thereof. When implemented using software, the above embodiments may be implemented as a whole or in part in the form of a computer program product. The computer program product includes one or more computer instructions. When the computer program instructions are loaded and executed by the computer, all or part of the processes or functions according to the embodiments of the present disclosure are generated. The computer may be a general-purpose computer, a special-purpose computer, a computer network, or other programmable devices. The computer instructions may be stored in a computer-readable storage medium or may be transmitted from one computer-readable storage medium to another computer-readable storage medium. For example, the computer instructions may be transmitted from a website site, a computer, a server or a data center to another website, computer, server or data center by wired (such as a coaxial cable, an optical fiber, a digital subscriber line (DSL)) or wireless (such as infrared, radio, microwave, etc.) manner. The computer-readable storage medium may be any available medium that can be accessed by the computer or a data storage device such as the server and the data center, and the like including one or more available medium integrations. The available medium may be a magnetic medium (e.g., a floppy disk, a hard disk, a magnetic tape), an optical medium (e.g., DVD), or a semiconductor medium (e.g., Solid State Disk (SSD)), or the like.

It should be noted that in the present disclosure, relational terms such as "first" and "second" are only used to distinguish one entity or operation from another entity or operation, and do not necessarily require or imply the existence of any such actual relation or sequence between these entities or operations. Moreover, the terms "include," "contain" or any other variant thereof are intended to cover non-exclusive inclusion, such that a process, method, article or device that includes a series of elements includes not only those elements but also other elements not explicitly listed, or also other elements that are inherent to such process, method, article, or device. Without further limitations, the element defined by the sentence "include a . . . " does not exclude that there are other identical elements in the process, method, article or device that includes the one element.

The above are only specific implementations of the present disclosure, such that those of skill in the art may understand or implement the present disclosure. Various modifications to these embodiments will be apparent to those of skill in the art, and the general principles defined herein may be implemented in other embodiments without departing from the spirit or scope of the present disclosure. Therefore, the present disclosure will not be limited to the embodiments shown herein, but should conform to the widest scope consistent with the principles and novel features claimed herein.

The invention claimed is:

1. A method for data uploading, applied to a server, comprising:
receiving a block upload request sent by a sub server of a target node in a blockchain;
determining whether block data corresponding to the block upload request has been uploaded to a block data storage system;
acquiring the block data if the block data corresponding to the block upload request is not uploaded to the block data storage system, and uploading the block data to a storage space of the block data storage system; and
sending an uploading success instruction to the sub server if the uploading is successful, so as to instruct the sub server to delete the block data stored on a first peer of the target node; wherein the first peer is a node that stores latest block data in the blockchain.

2. The method according to claim 1, further comprising:
sending an already-uploaded response to the sub server if the block data corresponding to the block upload request has been uploaded to the block data storage system, such that the sub server deletes the block data of the first peer.

3. The method according to claim 1, wherein acquiring the block data comprises:
acquiring the block data from a second peer, wherein the second peer is a node that stores all block data in the blockchain, the second peer and the block data storage system are in a same local area network.

4. The method according to claim 1, wherein acquiring the block data comprises:
acquiring the block data from the first peer, wherein the first peer and the sub server are in a same local area network.

5. The method according to claim 1, further comprising:
parsing out identification information of the block data from the block upload request; and
determining the block data corresponding to the block upload request based on the identification information.

6. The method according to claim 5, wherein determining whether the block data corresponding to the block upload request has been uploaded to the block data storage system comprises:
recording a past block upload request;
determining whether the identification information contained in the block upload request is consistent with past identification information contained in the past block upload request; and
deciding that the block data corresponding to the block upload request has been uploaded to the block data storage system, if the identification information contained in the block upload request is consistent with the past identification information contained in the past block upload request.

7. The method according to claim 1, further comprising:
receiving a data query request sent by the sub server, wherein the data query request is used to request query of the block data of the first peer;
sending the data query request to the block data storage system, such that the block data storage system searches for block storage data containing the block data according to the data query request;
receiving the block storage data sent by the block data storage system; and
sending the block storage data to the sub server, such that the sub server sends the block storage data to the first peer, and querying the block data from the block storage data by means of the first peer.

8. An electronic device comprising a memory and a processor, a computer program being stored in the memory and executable by the processor, wherein the processor, when executing the computer program, implements the steps of the method according to claim 1.

9. A non-transitory computer-readable storage medium storing program instructions, wherein the program instructions, when executed by a processor, cause the processor to perform the method according to claim 1.

10. A system for data uploading, comprising:
first peer, configured to store block data;
a server, configured to receive a block upload request sent by a sub server of a target node in a blockchain, send the block data to a block data storage system, and send an uploading success instruction to a sub server after the uploading is completed;
the block data storage system, configured to receive the block data sent by the server, and send upload-ending information to the server; and
the sub server, configured to receive the uploading success instruction from the server and delete the block data of the first peer.

* * * * *